United States Patent
Baciu et al.

(10) Patent No.: US 8,331,919 B1
(45) Date of Patent: Dec. 11, 2012

(54) SYSTEM, METHOD, AND SOFTWARE PROGRAM PRODUCT FOR TRACKING CALL FAILURES ON A WIRELESS PHONE

(75) Inventors: Assaf Baciu, Berkeley, CA (US); Hetal Pandya, Cupertino, CA (US); Kevin M. Stone, Mountain View, CA (US); David A. Winarsky, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 200 days.

(21) Appl. No.: 12/386,969

(22) Filed: Apr. 24, 2009

(51) Int. Cl.
*H04M 3/00* (2006.01)

(52) U.S. Cl. ..... 455/418; 455/405; 455/425; 455/67.11; 455/423; 455/445

(58) Field of Classification Search ............... 455/405, 455/425, 67.11, 423, 422.1, 445, 550.1
See application file for complete search history.

(56) References Cited

U.S. PATENT DOCUMENTS

| | | | |
|---|---|---|---|
| 7,215,969 B2 * | 5/2007 | Benco et al. | 455/456.6 |
| 7,822,414 B2 * | 10/2010 | Bender et al. | 455/423 |
| 2003/0064720 A1 * | 4/2003 | Valins et al. | 455/423 |
| 2004/0203728 A1 * | 10/2004 | Schwinke et al. | 455/425 |
| 2005/0147052 A1 * | 7/2005 | Wu | 370/252 |
| 2006/0217113 A1 * | 9/2006 | Rao et al. | 455/422.1 |
| 2010/0135470 A1 * | 6/2010 | Bishop | 379/32.01 |
| 2010/0267378 A1 * | 10/2010 | Hamabe et al. | 455/423 |

* cited by examiner

*Primary Examiner* — Kamran Afshar
*Assistant Examiner* — Sayed T Zewari
(74) *Attorney, Agent, or Firm* — Lessani Law Group, PC

(57) ABSTRACT

A system, method and software application track call failures on a wireless phone. A software application on the phone monitors outbound calls made on the phone to determine whether or not a call fails. In one embodiment, such monitoring is done only for a select period of time (e.g., the initial few seconds when the phone is attempting to connect to a call to the wireless communication carrier's network), and, in an alternate embodiment, such monitoring is done for the duration of the call. If a call fails, the software application stores information related to the call. Examples of such types of information include the time the call failed, the location of the phone at call failure, and identification information for the phone. The stored call information is then sent to the wireless communication carrier to enable the carrier to assess network quality.

23 Claims, 4 Drawing Sheets

SYSTEM, METHOD, AND SOFTWARE PROGRAM PRODUCT FOR TRACKING CALL FAILURES ON A WIRELESS PHONE

BACKGROUND OF THE INVENTION

1. Field of the Invention

This invention relates generally to telecommunications and, more specifically, to tracking call failures on a wireless phone.

2. Description of the Background Art

Many wireless telecommunication carriers track the amount of dropped calls in their networks in order to monitor the quality of their network. However, telecommunication carriers currently are able to track calls only after calls have been connected with the telecommunications network. A wireless phone may be unsuccessful in connecting a call to the wireless network, and telecommunication carriers are currently unable to accurately assess the number or percentage of calls that fail for such reason. Therefore, it would be desirable for a telecommunication carrier to be able to track call failures that occur due to the inability of phones to connect with the carrier's network.

SUMMARY

The present invention provides a system, method and software application for tracking call failures on a wireless phone. A software application on the phone monitors outbound calls made on the phone to determine whether or not a call fails. In one embodiment, such monitoring is done only for a select period of time (e.g., the initial few seconds when the phone is attempting to connect a call to a wireless carrier's network), and, in an alternate embodiment, such monitoring is done for the duration of the call. If a call fails, the software application stores information related to the call. Examples of such types of information include the time the call failed, the location of the phone at call failure, and identification information for the phone. The stored call information is then sent to the wireless communication carrier. Such information could be sent after each call, or call failure/call success information may be accumulated over a period of time, and, after such period of time, sent to the wireless communication carrier. The call failure/success information enables the carrier to assess and analyze network quality, including the ability of wireless phones to successfully connect calls to the carrier's network.

DETAILED DESCRIPTION OF THE PREFERRED EMBODIMENTS

Figure 1:
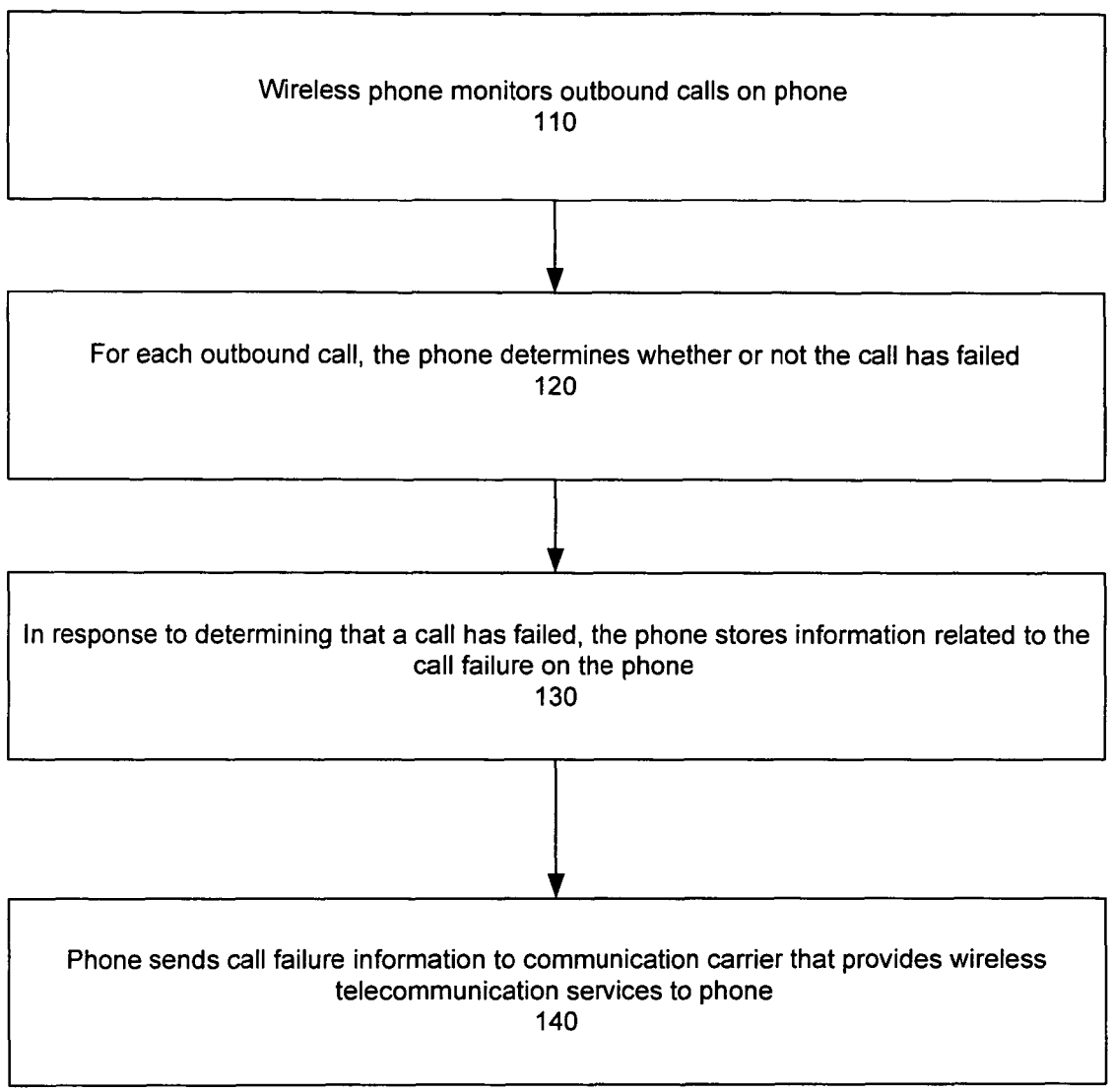
FIG. 1 illustrate a flowchart that shows a method for tracking call failures on a phone.

FIG. 1 illustrates a method for tracking call failures on a wireless phone. This method may be implemented on various different types of wireless phones, including, but not limited to, personal digital assistants. The term "wireless phone," as used herein, includes any electronic apparatus capable of wirelessly receiving voice data from a communications network and wirelessly transmitting voice data to a communications network.

Referring to FIG. 1, software on the phone monitors outbound calls (step 110). For each outbound call, the software on the phone determines whether or not the call has failed (step 120). An example of a call failure is when a phone is unable to connect a call with the wireless communication carrier's network. Another example of a call failure is when a call terminates prematurely because the calling phone was unable to stay connected with the carrier's network during the duration of the call. In response to determining that a call has failed, the phone stores information related to the call failure on the phone (step 130). The phone sends the stored information to the carrier that provides wireless telecommunication services to the phone (step 140).

In one embodiment, outbound calls are monitored for failure during the entire duration of the call. In an alternate embodiment (and the preferred embodiment), the outbound call is only monitored for a certain period of time. For example, if it desired that the phone track only call failures that occur due to failure to connect with the communication carrier's network, then such period of time can be a time that is approximately equal to or less than the amount time it typically takes for a wireless phone to connect to the communication carrier's network.

The phone may send the carrier information related to a call failure immediately after a call failure, or it may accumulate information related to failed calls over a period of time, and then periodically send the accumulated information to the communication carrier.

The type of information stored about the call failure can include (but is not limited to) the time of the call failure, the location of the phone at the time of the call failure, the ID of the cell in which phone was located at time of call failure, the network signal strength at the time of the call, and the number dialed for the call.

In one embodiment, the phone transforms information related to call failures into call failure/success rate statistics desired by the wireless communication carrier. For example, the phone may calculate and store the percentage of outbound calls that have failed or succeeded over a period of time (e.g., 10 minutes, 1 day, 1 week, 1 month, etc.). In one embodiment, such percentage reflects only the calls that have failed/succeeded prior to being connected to the communication carrier's network.

In one embodiment, software on the phone organizes call failure/success statistics by cell ID. A cell is the area covered by a transmission tower in the wireless carrier's network, and each cell can be associated with a unique ID. Accumulating call failure/success information, along with corresponding cell ID information, from multiple phones enables a carrier to determine which cells fail the most in the carrier's network.

In response to receiving information about one or more call failures from a phone, the wireless communication carrier's network can send a message, such as a text message, back to the phone for display to the user. An example of such a text message is: "We are sorry your call dropped. We are working to improve our service."

Figure 2:
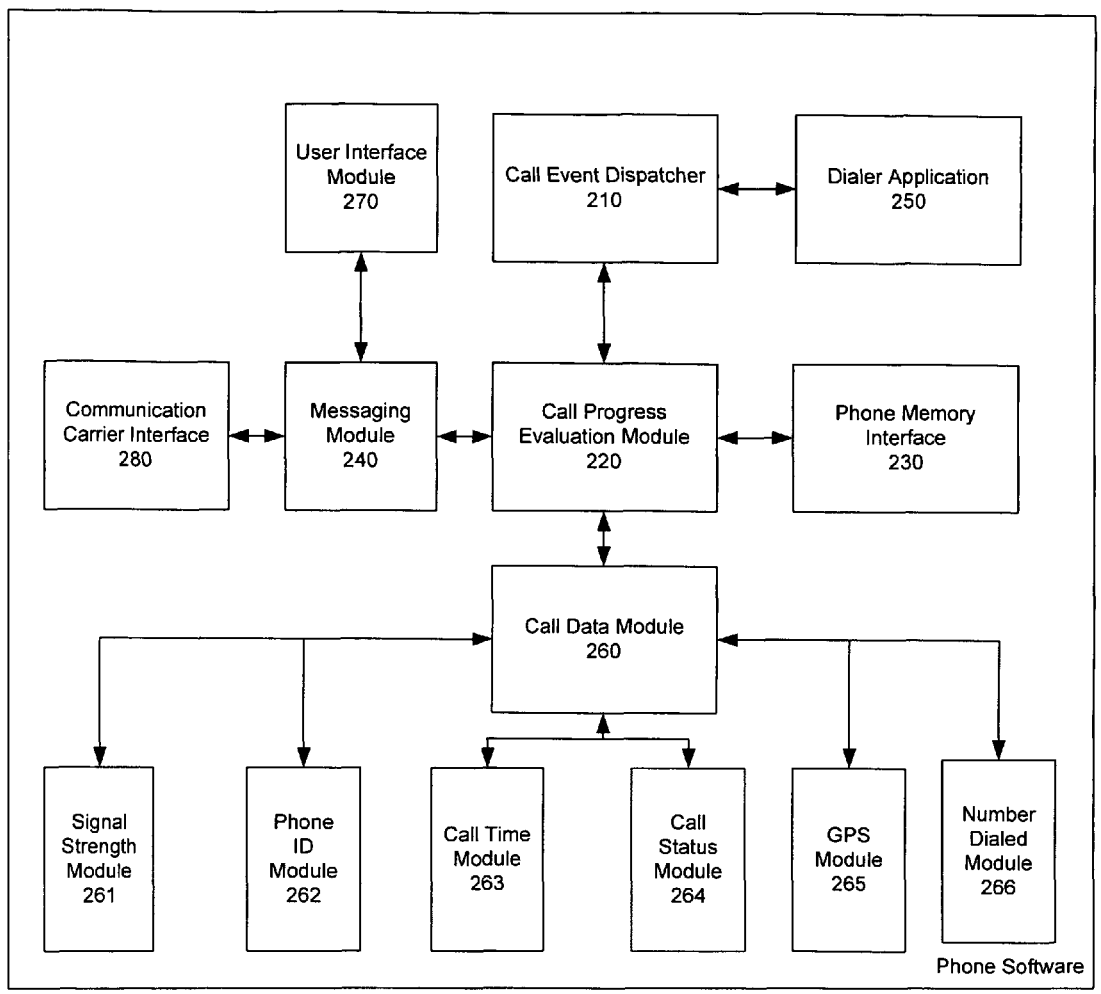
FIG. 2 is block diagram representation of software on a phone that can be used to implement one embodiment of the present invention.

FIG. 2 illustrates an example of a software architecture on a wireless phone that can be used to implement the present invention. For ease of explanation, the software can be thought of as divided into various functional modules. These modules are a Call Initiation Event Dispatcher 210, a Dialer Application 250, a User Interface Application 270, a Call Progress Evaluation Module 220, a Messaging Module 240, a Communication Carrier Interface 280, a Phone Memory Interface 230, a Call Data Module 260, a Signal Strength Module 261, a Phone ID Module 262, a Call Time Module 263, a Call Status Module 264, a GPS Module 265, and a Numbered Dialed Module 266.

Those skilled in the art will appreciate that a phone will include additional functionality not represented by the above modules. However, such functionality is well known in the art and a discussion of such functionality is not relevant for an understanding of the invention described herein. Moreover, those skilled in the art will appreciate that there may be many ways to implement the present invention, and the software implementation described herein with respect to FIG. 2 is just one example of an implementation.

Call-initiation event dispatchers (e.g., keystroke event dispatchers), user interface applications, and dialer applications are well known in the art. The Call Initiation Event Dispatcher 410 listens for call-initiation events (e.g., user dials phone number, double clicks on a phone number, uses voice-activated dialing) and provides such events to other applications on the phone that register for call-initiation events. The Dialer Application 450 also registers for call-initiation events and dials phone numbers initiated by the user, unless such phone numbers are first consumed by another application. The User Interface Application 460 enables the display of information in the user interface on the phone.

Figure 3A:
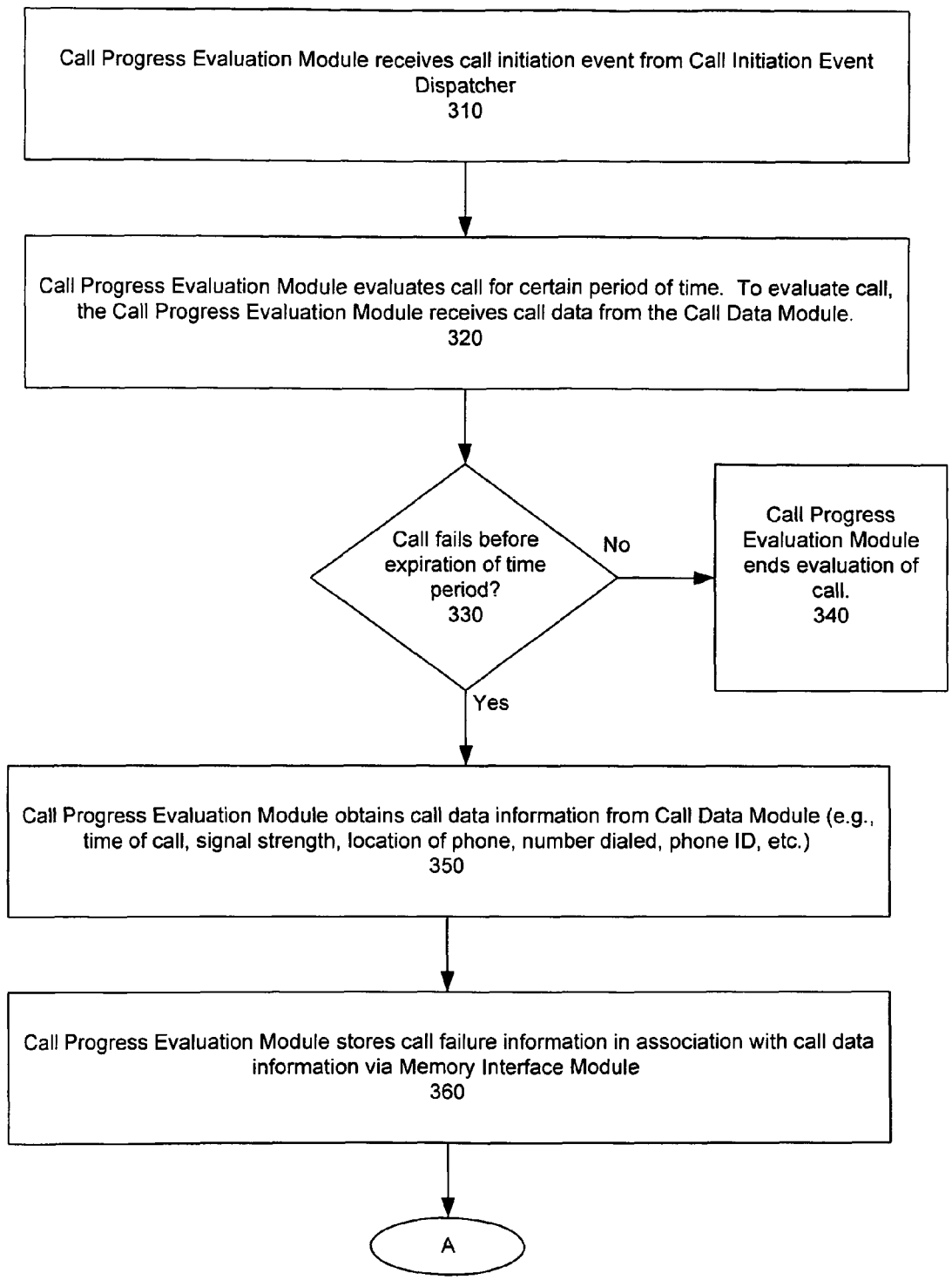
FIGS. 3a-3b are flowcharts that illustrate an example of the operation of the software modules shown FIG. 2 in one embodiment of the present invention.
Figure 3B:
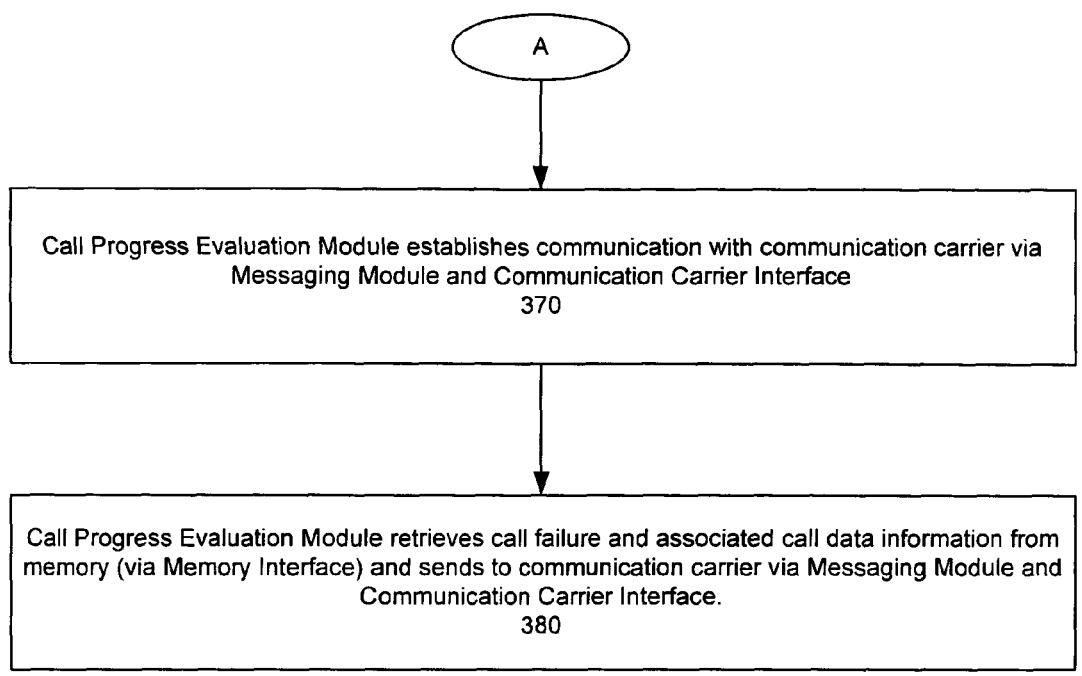

The Call Progress Evaluation Module 220, the Messaging Module 240, the Communication Carrier Interface 280, the Phone Memory Interface 230, and the Call Data Module 260 can be used to track call failures on a phone. FIG. 3 illustrates an example of how these modules can operate to track call failures on a phone.

Referring to FIG. 3, the Call Progress Evaluation Module 220 registers for call-initiation events, and when a user initiates an outbound call, the Call Progress Evaluation Module receives a call evaluation event from the Call Initiation Event Dispatcher 210 (step 310). The Call Progress Evaluation Module then evaluates the call for a certain period of time (step 320). In the preferred embodiment, the period of time is approximately equal to the amount of time it normally takes for a call to connect with the communication carrier's network, but the period of time could be shorter or longer.

In evaluating the call, the Call Progress Evaluation Module 220 receives information about status of the call from the Call Data Module 260. The Call Data Module 260 communicates with modules 261-266 to obtain data related to the phone call. The Signal Strength Module 261 monitors the network signal strength, the Phone ID module 262 provides the identification information for the phone, the Call Time Module 263 notes the time that the call was made, the Call Status Module 264 monitors the status of the call (e.g., in process, failed, terminated), the GPS Module 265 uses GPS technology to track the location of the phone at the time of the call, and the Number Dialed Module 266 monitors the phone number dialed by the phone user for the call.

The Call Progress Evaluation Module 220 monitors the call to determine if it fails prior to the certain period of time (step 330). If the call does not fail prior to the expiration of certain period of time, the Call Progress Evaluation Module 220 ends its monitoring of the call (step 340). In an alternate embodiment, instead of monitoring the call for a certain period of time, the Call Progress Evaluation Module 220 can monitor the call for the duration of the call. In such case, then the Call Progress Evaluation Module 220 evaluates the call until either it fails or the call is terminated, whichever comes first.

If the call fails prior to the expiration of the specified time period, the Call Progress Evaluation Module 220 obtains call data information from the Call Data Module 260 (step 350). Such information can include, but is not limited to, the time of call, signal strength, location of phone, number dialed, cell ID, and phone ID. The Call Progress Evaluation Module 220 stores the call failure information in the phone's memory in association with the call data information via the Phone Memory Interface Module 230 (step 360).

After the call failure, or at a later time, the Call Progress Evaluation Module 220 establishes communication with the communication carrier via the Messaging Module 240 and Communication Carrier Interface 250, which are responsible for generating and sending/receiving messages to and from the communication carrier (step 370). The Call Progress Evaluation Module 220 retrieves the call failure and associated call data information from phone memory (via the Phone Memory Interface Module 230), and it send such information to the communication carrier via the Messaging Module 240 and Communication Carrier Interface 280 (step 380). As stated above, such information may be sent immediately after a call failure, or, alternatively, call failure/success statistics (e.g., percentage of calls that fail; percentage of call that succeed) may be calculated on the phone for a period of time (e.g., 1 day, 1 week, 1 month, etc.) and then later sent to the carrier. For example, the software on the phone may calculate the call success or failure rate over a period of time, where such calculation can be performed for each cell in which the phone was located during such period of time. In such case, the phone can report to the carrier the call success or failure rate for each cell in which the phone was located during a period of time.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for tracking call failures on a wireless phone, the method comprising:
    monitoring on a wireless phone outbound calls made on the phone;
    for each outbound call, determining on the phone whether or not the call fails;
    in response to determining that a call has failed, storing information relating to the call failure on the phone;
    calculating on the phone a percentage of outbound calls over a period of time that have been successfully connected to the carrier's network and that have failed to successfully connect to the carrier's network;
    sending the information to a communication carrier that provides wireless telecommunication services for the phone, wherein such success percentage data and failure percentage data is included in the information sent to the carrier; and
    providing a message from the wireless communication carrier to a user of the phone related to the call failure.

2. The method of claim 1, wherein determining whether or not the call fails comprises determining whether or not the call fails within a certain time period.

3. The method of claim 2, wherein the certain time period is approximately equal to or less than the time typically required for the phone to connect a call to the wireless communication carrier's network.

4. The method of claim 1, wherein determining whether or not a call fails comprises determining whether or not the call fails prior to the call being connected to the wireless communication carrier's network.

5. The method of claim 1, wherein the information is sent to the wireless communication carrier after each call failure.

6. The method of claim 1, wherein the information for each call failure is accumulated for failed calls occurring over a period of time and, after such period of time, the accumulated information is sent to the wireless communication carrier.

7. The method of claim 1, wherein the information stored includes information related to the phone's location at the time of call failure.

8. The method of claim 7, wherein such information related to the phone location is obtained from a GPS application running on the phone.

9. The method of claim 7, wherein the information stored also includes the time of the call failure.

10. The method of claim 7, wherein the information stored also includes the number dialed by the user.

11. The method of claim 7, wherein such information related to phone location includes cell ID data for the phone.

12. The method of claim 1, wherein such percentage data is organized by cell ID to enable the carrier to identify the cells in the carrier's network that fail the most.

13. The method of claim 1, wherein such failure percentage data is organized by cell ID to enable the carrier to identify the cells in the carrier's network that fail the most.

14. A software program embodied on a non-transitory computer-readable medium on a phone that, when executed by a processor on the phone, enables the processor to perform the following method:
    monitoring on a wireless phone outbound calls made on the phone;
    for each outbound call, determining on the phone whether or not the call fails;
    in response to determining that a call has failed, storing information relating to the call failure on the phone;
    calculating on the phone a percentage of outbound calls over a period of time that have been successfully connected to the carrier's network and that have failed to successfully connect to the carrier's network;
    sending the information to a communication carrier that provides wireless telecommunication services for the phone, wherein such success percentage data and failure percentage data is included in the information sent to the carrier; and
    providing a message from the wireless communication carrier to a user of the phone related to the call failure.

15. The software program of claim 14, wherein determining whether or not the call fails comprises determining whether or not the call fails within a certain time period.

16. The software program of claim 15, wherein the certain time period is approximately equal to or less than the time typically required for the phone to connect a call to the wireless communication carrier's network.

17. The software program of claim 14, wherein the information stored includes information related to the phone's location at the time of call failure.

18. The software program of claim 17, wherein the information stored also includes the time of the call failure.

19. The software program of claim 17, wherein the information stored also includes the number dialed by the user.

20. The software program of claim 17, wherein such information related to phone location includes the ID of the cell in which the phone was located.

21. The software program of claim 14, wherein such the call success percentage data is organized by cell ID to enable the carrier to identify the cells in the carrier's network that fail the most.

22. The software program of claim 14, wherein such the call failure percentage data is organized by cell ID to enable the carrier to identify the cells in the carrier's network that fail the most.

23. A wireless phone for tracking call failures, comprising:
    a processor;
    a memory device operatively coupled to the processor;
    a call data module, implemented in software stored in the memory device and executed by the processor when the phone is in operation, that monitors information related to calls on the phone, including, for each call, the status of the call and the location of the phone at the time of the call;
    a call progress evaluation module, implemented in software stored in the memory device and executed by the processor when the phone is in operation, that receives information related to calls from the call data module, including status and phone location information, calculates a percentage of calls over a period of time that have been successfully connected to a wireless communication carrier's network and that have failed to successfully connect to the carrier's network, and stores information related to calls that failed due to a failure to connect the calls with the carrier's network; and
    a messaging module, implemented in software stored in the memory device and executed by the processor when the phone is in operation, that sends call failure information, including such success percentage data and failure percentage data, stored by the call progress evaluation module to the wireless communication carrier and provides messages from the wireless communication carrier to a user of the phone related to the call failure.

* * * * *